United States Patent [19]

Auskern

[11] 3,713,860
[45] Jan. 30, 1973

[54] BONE SUBSTITUTE

[75] Inventor: Allan Auskern, East Patchogue, N.Y.

[73] Assignee: The United States of America as represented by the United States Atomic Energy Commission

[22] Filed: Aug. 31, 1970

[21] Appl. No.: 68,578

[52] U.S. Cl. ............... 117/8.5, 117/93.31, 117/121, 117/161 UB, 128/92 C, 3/1
[51] Int. Cl. ................................................. A61f 1/24
[58] Field of Search ..... 117/8.5, 121, 161 UB, 93.31; 128/92 R, 92 C, 92 CA; 3/1

[56] References Cited

UNITED STATES PATENTS

| 3,314,420 | 4/1967 | Smith et al. | 128/92 R |
| 2,463,551 | 3/1949 | Myerson et al. | 128/92 R |
| 3,549,509 | 12/1970 | Casalina | 117/93.31 |

FOREIGN PATENTS OR APPLICATIONS

| 1,083,769 | 9/1967 | Great Britain | 128/92 R |

OTHER PUBLICATIONS

Illustrated leaflet, Zimmer Orthopaedic Ltd., p. XV (1952)

Primary Examiner—William D. Martin
Assistant Examiner—David Cohen
Attorney—Roland A. Anderson

[57] ABSTRACT

A bone substitute and a method for preparing the bone substitute in which porous aluminum oxide is initially impregnated with pure methyl methacrylate monomer. The monomer is polymerized by gamma irradiation and polymer is then removed by solution from selected areas where muscle and bone attachment is to be made in situ. Further irradiation sterilizes the bone substitute.

5 Claims, No Drawings

BONE SUBSTITUTE

SOURCE OF THE INVENTION

The invention described herein was made in the course of, or under a contract with the U.S. Atomic Energy Commission.

BACKGROUND OF THE INVENTION

During the last few years ceramic materials have been studied for use as bone substitutes in animals including human beings. These materials are attractive for a number of reasons. They are all oxides in their highest oxidation states, so they cannot oxidize further. They are essentially insoluble in body liquids, are non-toxic, and undergo no immunological reactions.

The physical and mechanical properties of many of the ceramics are similar, or can be adjusted to, those of bone, so a bone-ceramic system would be mechanically compatible. In this respect, metals are about 10 times stiffer than bone, and this difference in flexibility can cause irritation and damage to bone where bone and metal contact.

A major advantage of ceramic materials is that they can be made porous and that, if the pore size is large enough, connective and bone tissue will grow into the pores and be firmly bonded to the ceramic.

Hence, the goal of a permanent bone substitute, which is biologically inert, mechanically compatible, and strongly bonded to the skeleton appears possible with ceramic prosthetic devices.

One such material which has found some use as a bone substitute, either alone or in combination with other ceramics, is porous aluminum oxide. While, as already noted, this material is inert and mechanically compatible with natural bone, the porosity which is important for the purpose of allowing bone and tissue growth into the porous ceramic to obtain a sound, permanent bond, increases the possibility of fatigue failure over a period of time. Furthermore, when filling of the pores takes place due to this growth there develops a difference in the modulus of elasticity between the unfilled porous region and the filled region with the result that undesirable concentrations of stress are introduced.

BRIEF DESCRIPTION OF THE INVENTION

The drawbacks and disadvantages of the ceramic bone substitutes presently being used are largely overcome in accordance with the principles of this invention by a porous, substantially pure aluminum oxide body which is impregnated with methyl methacrylate free of all additives, and then polymerized by irradiation with gamma rays. Polymer is then removed only from those regions where bone or tissue growth is to develop. The first irradiation step, and a final irradiation step, if desired, thoroughly sterilizes the bone substitute for implantation. Both substantially pure aluminum oxide and the monomer have proven to be free of the rejection mechanism, compatible in medicinal use, and biologically inert.

A bone substitute for animal including human use, prepared in accordance with the principles of this invention is suitable for permanent implantation, so that metallic pins and fasteners are unnecessary. The substitute is considerably stronger, by a factor of two or more, than substitutes which remain largely porous in situ. Also, by proper choice of pore content and pore size the properties of the substitute can be designed to match those of bone quite closely. Because of the presence of the polymer throughout, fatigue strength is maintained in the structure. It should also be mentioned that a bone substitute prepared according to this invention can be readily machined into complex shapes with close tolerances.

It is thus a principal object of this invention to provide a bone substitute with improved mechanical characteristics and greater usefulness.

Other objects and advantages of this invention will hereinafter become obvious from a description of one or more preferred embodiments of this invention.

DESCRIPTION OF THE PREFERRED EMBODIMENT a body of substantially pure (e.g. 99.9 percent) aluminum oxide with 30 – 50 percent porosity by volume with the greater number of pores being in the range of 75 to 150 microns in diameter is impregnated with inhibitor free, catalyst free, promoter free, methyl methacrylate monomer (MMA). The pure MMA, which is hence free of all additives, is used to avoid any tissue reactions which may occur from the residues of the additives, and can only be polymerized by radiation. Pore size which is under the specified range does not adequately permit bone growth. Excessive pore size is difficult to produce.

The monomer impregnated body is then subjected to gamma irradiation from a suitable source such as cobalt-60. Dosage and length of exposure are sufficient to polymerize the MMA throughout the body. Gamma rays are required for this purpose because of its penetrating characteristics.

The body is then machined into the shape necessary for its intended use. Under some circumstances, the body may be shaped exactly to size before impregnation. The areas on the surface where no bone growth or tissue connection are desired are then masked with a suitable material such as a medical grade silastic polymer. The exposed areas are then subject to a suitable solvent such as acetone in an ultrasonic bath, with the result that polymer in the exposed surface is dissolved and removed. The depth obtained is dependent on the length of exposure, for example, exposure for 15 to 30 minutes results in polymer removal to a depth of about 200 to 400 microns. Preferably, polymer is removed to a depth falling into the range of 100 to 400 microns. If the depth of polymer removal is less than 100 microns there is no effective bonding by tissue growth. Removal in excess of 400 microns does not improve the bonding and leaves some of the bone substitute unfilled which as already noted is undesirable.

The body is then cleaned, such as by using a detergent, followed by rinsing in distilled water and drying. Further irradiation by gamma rays insures sterilization of the bone substitute.

The bone substitute in accordance with this invention is useful as a bone gap bridge, a skull plate, and in a system for pinning fractures. In a pinning system, the ceramic-polymer would be shaped to function as fasteners and bolts.

What is claimed is:

1. The method of preparing an article of manufacture comprising steps of:
   a. forming a porous ceramic body of substantially pure aluminum oxide;
   b. impregnating said body with methacrylate monomer free of catalyst and additives;
   c. subjecting the impregated body to gamma radiation for a time sufficient to polymerize said monomer followed by machining of said article to proper size and shape; and
   d. dissolving polymer from selected areas of said body to a minimum depth of 100 microns to obtain exposed porous surface regions in said body.

2. The method of claim 1 in which said body is exposed again to radiation of sufficient duration and intensity to cause sterilization thereof.

3. The method of claim 2 in which said body has a pore size in the range of 75 to 150 microns.

4. The method of claim 2 in which said body has a porosity of 30 – 50 percent by volume.

5. The method of claim 2 in which the polymer is dissolved ultrasonically in said selected areas to a depth in the range of 100 to 400 microns.

* * * * *

UNITED STATES PATENT OFFICE
CERTIFICATE OF CORRECTION

PATENT NO. : 3,713,860

DATED : January 30, 1973

INVENTOR(S) : Allan Auskern

It is certified that error appears in the above-identified patent and that said Letters Patent are hereby corrected as shown below:

In claim 1, line 5, before "methacrylate" insert --methyl--.

Signed and sealed this 15th day of July 1975.

(SEAL)
Attest:

RUTH C. MASON
Attesting Officer

C. MARSHALL DANN
Commissioner of Patents
and Trademarks